E. B. MOWER.
APPARATUS FOR CARBONATING AND DISPENSING BEER AND OTHER LIQUIDS.
APPLICATION FILED NOV. 14, 1908.
932,048.
Patented Aug. 24, 1909.
2 SHEETS—SHEET 2.
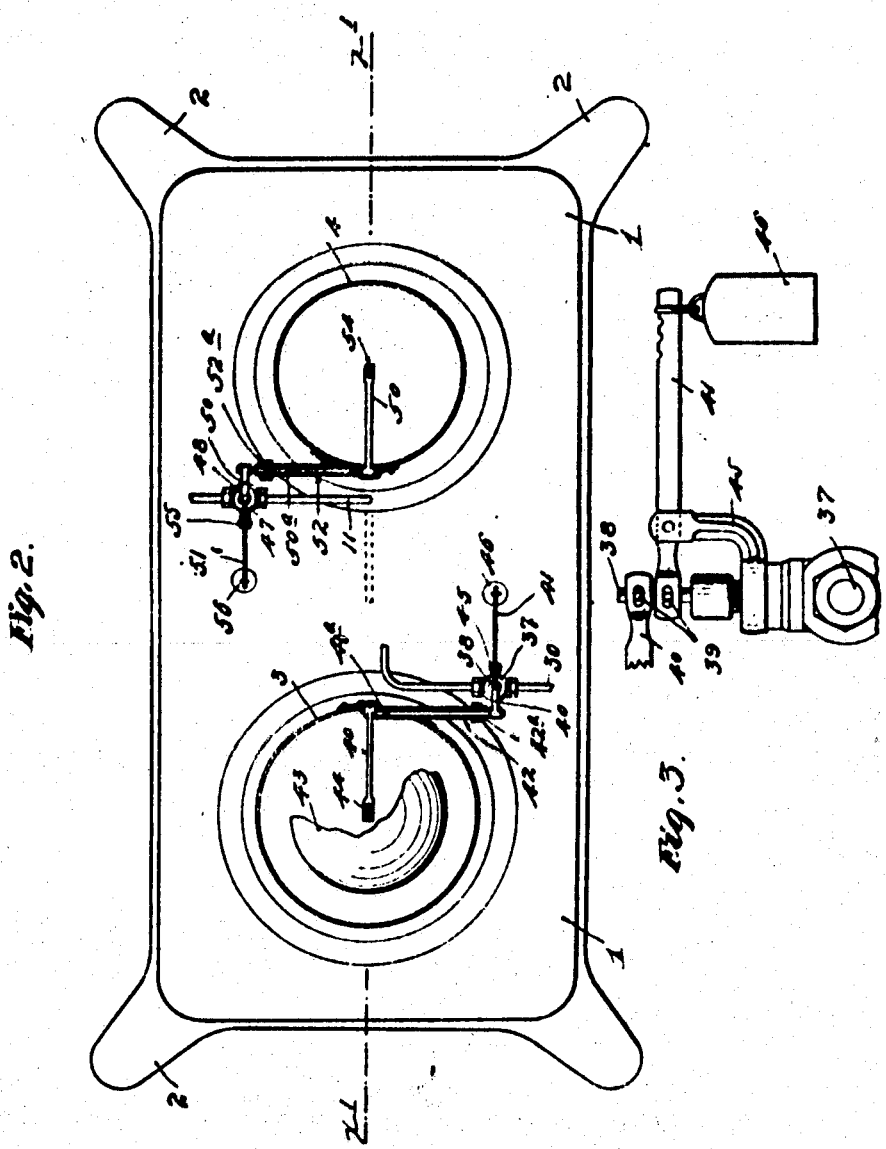

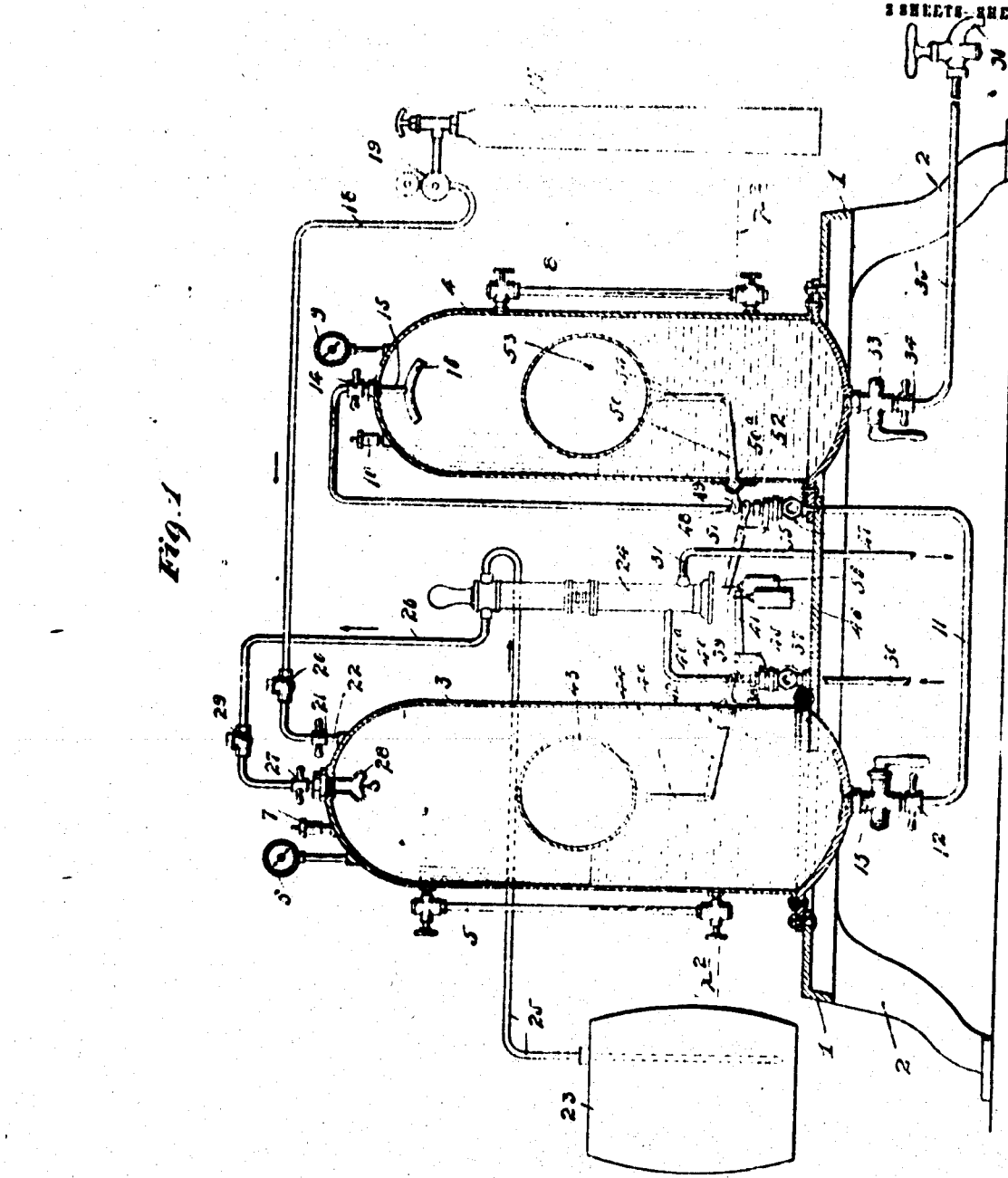
E. B. MOWER.
APPARATUS FOR CARBONATING AND DISPENSING BEER AND OTHER LIQUIDS.
APPLICATION FILED NOV. 14, 1906.
932,048.
Patented Aug. 24, 1909.
3 SHEETS—SHEET 1.

UNITED STATES PATENT OFFICE.

EUGENE B. MOWER, OF MINNEAPOLIS, MINNESOTA, ASSIGNOR TO AUTOMATIC CARBONATOR CO., OF MINNEAPOLIS, MINNESOTA, A CORPORATION OF MINNESOTA.

APPARATUS FOR CARBONATING AND DISPENSING BEER AND OTHER LIQUIDS.

932,048.

Specification of Letters Patent. Patented Aug. 24, 1909.

Application filed November 14, 1908. Serial No. 345,562.

*To all whom it may concern:*

Be it known that I, EUGENE B. MOWER, a citizen of the United States, residing at Minneapolis, in the county of Hennepin and State of Minnesota, have invented certain new and useful Improvements in Apparatus for Carbonating and Dispensing Beer and other Liquids; and I do hereby declare the following to be a full, clear, and exact description of the invention, such as will enable others skilled in the art to which it appertains to make and use the same.

My invention has for its object to provide an improved apparatus for carbonating and dispensing beer and other liquids; and to the above ends, it consists of the novel devices and combinations of devices hereinafter described and defined in the claims.

This improved apparatus is especially adapted for carrying out the improved process of carbonating and dispensing beer and other liquids, set forth and claimed in application for Letters Patent of the United States, filed by me of date October 24, 1908, under Serial Number 459,313.

In carrying out the improved process I first confine the liquid to be carbonated or otherwise charged with gas in a closed receptacle and subject the same to a charge of gas under high pressure. Second, I transfer the charged liquid to a closed receptacle, wherein it is subjected to a very greatly reduced pressure but which is sufficient to hold the original charge in bond, and do not further charge the said liquid with gas. Third, the charged liquid, under the very greatly reduced pressure, is drawn off with the original charge or amount of gas contained therein. In practice I have found that where a liquid is charged with a gas under high pressure, say 70 pounds, and the gas is thoroughly absorbed thereby, only about 10 or 15 pounds pressure will be required above atmospheric pressure, or, in other words, about two atmospheres of pressure will be required to cause the liquid to hold the said gas in bond or absorbed.

In the following description of my improved apparatus, I will consider the same in its use for dispensing and carbonating beer; but it will, of course, be understood that the apparatus is capable of use for charging other beverages or liquids with carbonic acid gas, or any other suitable gas.

Hitherto, it has been the practice to carbonate beer before it is placed in the barrel, keg or other containing package. It has also been the common practice to force the beer from the keg by introducing into the keg, either carbonic acid gas or air, under pressure. The gas, thus introduced into the keg while the beer is in static condition, does not carbonate the beer to any perceptible extent, and hence does but little more than to supply a pressure sufficient to force the beer from the keg. This method of treatment is objectionable for many reasons. It does not uniformly carbonate the beer in the keg or barrel. The beer, which is first drawn from the keg will run "wild" and too much to foam, while more than the last half of the contents of the keg will run "flat" or "dead", and hence will have a stale or insipid taste. Furthermore, when the keg is emptied of beer, it will be filled with carbonic acid gas, all of which gas will be wasted. When air is used to force the beer from the keg, it absorbs a large part of the gas, with which the beer has been charged, thereby more quickly reducing the gas vitality of the beer.

The above noted limitations are all removed by my improved apparatus, which, in its preferred form, is illustrated in the accompanying drawings, wherein like characters indicate like parts throughout the several views.

Referring to the drawings, Figure 1 is a vertical section, principally on the line $x^1$ $x^1$ of Fig. 2, but with some parts shown in full, and some parts shown in diagram. Fig. 2 is a horizontal section, taken approximately on the line $x^2$ $x^2$ of Fig. 1, some parts being broken away; and Fig. 3 is a detail in elevation, corresponding in the direction in which it is viewed to Fig. 1, and showing the pump controlling valve and certain connections thereto, some parts being broken away.

The numeral 1 indicates a bed plate which, as shown, has supporting legs 2. This bed plate 1 rigidly supports two upright tanks 3 and 4, the former of which is preferably larger than the latter. These tanks 3 and 4 afford, respectively, what are herein designated as "the carbonating tank" and the "reducing tank". The tank 3 is shown as provided with a sight tube 5, a pressure gage 6, and a blow-off or safety valve 7, all of which parts may be of the usual construction. Likewise, the tank 4 is provided with a sight tube 8, a pressure gage 9, and a blow-off or safety valve 10, which parts may also be of the usual construction. The lower portion of the tank 3 is in communication with the upper portion of the tank 4, through a delivery tube 11 which, at its receiving end, is connected by a coupling 12 to a depending valved nipple 13, at the bottom of said tank 3. The delivery end of said tube 11 is connected by a coupling 14 to the upper end of a short tube 15 that depends into the upper end of the tank 4, and terminates in a laterally extended, open-ended, discharge nozzle 16.

Carbonic acid gas is supplied to the upper portion of the carbonating tank 3 from a gas storage tube or tank 17, which is connected to said tank 3 by a delivery pipe 18. In the delivery pipe 18, close to the storage tube 17, is a reduction valve 19 of the usual construction, and which is adapted to be set to deliver the gas into the carbonating tank 3 under any desired pressure. In the delivery pipe 18 is an ordinary check valve 20 which permits the flow of the gas through said pipe into said tank, but prevents a reverse flow. A coupling 21 connects the body of the pipe 18 to a stub pipe 22 which is rigidly secured to and opens directly into the upper end of the tank 3.

The numeral 23 indicates what may be assumed to be a beer keg.

The numeral 24 indicates a pump, which in the present instance, is of the type known to the trade as a hydraulic water lift. As shown, this pump is of the type disclosed in Letters Patent No. 623,297, issued to E. H. Weatherly ed, April 18, 1899. A pipe 25 leads from the bottom of the keg 23 to one side of the upper cylinder, to-wit, the pumping cylinder, of the pump, and another pipe 26 leads from the other side of said cylinder to the upper portion of the carbonating tank 3 and, as shown, is directly connected by a coupling 27 to the outwardly projecting stem of a spraying nozzle or atomizer 28, which is located within the said tank 3. In the pipe 26 is a check valve 29 which permits the flow of the beer from the pump into the tank 3, but checks and prevents a reverse flow. A water supply pipe 30 leads from a suitable source of water supply, under pressure, such, for instance, as a city water main, and opens into the lower or operating cylinder of the pump 24.

The numeral 31 indicates a water discharge pipe which leads from the lower or operating cylinder of the pump 24 to a suitable point of discharge.

Depending from the bottom of the reducing tank 4 is a valved stem 33 to which, by means of a coupling 34, is attached the receiving end of a beer delivery pipe 35, which pipe leads to a suitable point of delivery, such as the bar, and terminates in a dispensing nozzle 36.

Interposed in the water supply pipe 30 of the pump, is a controlling valve 37, the stem 38 of which works vertically upward through a suitable stuffing box, as best shown in Fig. 3. The projecting portion of the valve stem 38 is connected, by pins 39, to the short ends of a pair of reversely projecting levers 40 and 41. The lever 40 includes a shaft 40ª which forms its fulcrum and which is loosely journaled in a sleeve 42, which, as shown, projects tangentially from the lower portion of the tank 3 and provided, at its projecting end, with a stuffing box 42ª. The relatively long inner arm of the lever 40 projects into the tank 3 and is connected to a float 43, as shown, by means of a link 44. The float 43 is, as shown, in the form of a hollow metallic ball. The lever 41 is, as shown, pivoted to a bracket 45 supported by the valve 37, and at its free end, it is provided with an adjustable weight 46.

In the tube 11 which connects the two tanks 3 and 4, is a valve 47, which may be of the same construction as the valve 37 before described. The stem 48 of this valve is connected, by pins 49, to the short ends of a pair of levers 50 and 51, which levers correspond in construction and arrangement to the levers 40 and 41. The lever 50 includes a shaft 50ª, that works through a sleeve 52, which sleeve, as shown, projects tangentially from the tank 4, and is provided, at its outer end, with a stuffing box 52ª. The long inner arm of the lever 50 is attached to a float 53, as shown, by means of a link 54. The lever 51 is pivoted to a bracket 55 on the casing of the valve 47, and at its free end, it is provided with an adjustable weight 56.

The construction and arrangement of the valve 37, and the float operated-connections which coöperate therewith, are such that the said valve will be forced downward into a closed position, under the action of the float, whenever the column of beer within the carbonating tank 3 reaches approximately the level indicated in Fig. 1. Also the construction of the valve 47, and the arrangement of the float connections which coöperate therewith, are such that said valve will be forced downward into a closed position, by the float 53, whenever the column of beer within the reducing tank 4 reaches approximately the height indicated in Fig. 1.

A relatively high pressure of the gas within the carbonating tank 3 is desirable, and we will assume this pressure to be fifty (50) pounds per square inch, while the gas pressure in the reducing tank 4 should be about ten (10) pounds. These pressures being once established in the said tanks, will be automatically maintained, as will presently more fully appear. One way to establish the respective desired pressures in the tanks is, first to fill them entirely with gas, and then start the beer pump into action, and allow the two tanks to fill to the points where their floats 43 and 53 respectively will close the two valves 37 and 47, and then to allow the escape of gas from the tanks until the desired respective pressures are reached. Assuming the desired pressure in the tank 3 to be fifty pounds, and the desired pressure in the tank 4 to be ten pounds, the safety valve 7 of said tank 3 should be set to blow off at a pressure not much in excess of fifty pounds, while the safety valve 10 of said tank 4 should be set to blow off at a pressure not much in excess of ten pounds. Also the reduction valve 19 of the gas supplying device should be set to deliver gas into the tank 3 whenever the pressure in said tank is reduced below fifty (50) pounds.

Assuming the apparatus to be charged, as above stated, and the faucet 36 to be closed, the parts will occupy the positions indicated in Fig. 1, and the beer will be held in static condition. When the faucet 36 is opened, beer will, of course, be drawn under low pressure from the bottom of the reducing tank 4, thus causing the column of beer in said tank to lower and drop down the float 53. When the float 53 is thus allowed to lower, its own weight, together with that of the weighted lever 51—56, will raise the stem 48 and open the valve 47, thereby causing a flow of beer from the carbonating tank 3 into the said reduction tank 4. As is evident, whenever a sufficient amount of beer has been forced from the tank 3 into the tank 4 to bring the beer contained in the latter again up to normal altitude, the float 53 will again close the valve 47, and stop the further flow of beer from said tank 3 into said tank 4.

Whenever the beer is caused to flow from the carbonating tank 3 into the reducing tank 4, as above described, the column of beer within said tank 3 will, of course, be lowered, whereupon the float 43 will lower, and its weight, assisted by that of the weighted lever 44—46, will open the valve 37, and thereby turn on the water and throw the pump 34 into action. Whenever the pump 34 is thrown into action, it will pump beer from the keg 23 into the upper end of the tank 3, and will discharge the same in a spray from the spraying nozzle or atomizer 28. The lowering of the column of beer within said tank 3 also causes a flow of carbonic acid gas into said tank from the storage tube 17, so that the spray of inflowing beer will be discharged into and will be precipitated through a fresh charge of carbonic acid gas. Whenever the column of beer within the tank 3 is again restored to its normal altitude by the fresh charge of beer, it is, of course, evident that the float 43 will again close the valve 37 and throw the pump out of action, thereby temporarily cutting off the further supply of beer into said tank 3.

In this way, the supply of beer in each tank is kept up, and the predetermined desired gas pressures therein are maintained.

With the above described apparatus, the beer or other beverage discharged at the dispensing faucet will be evenly or uniformly charged with gas, and will always be delivered in fresh or live condition. This result will be accomplished even when dead or flat beer is pumped from the keg or barrel, since the beer is recharged with gas, and given new life, on its way from the keg to the dispensing faucet. In fact, with this apparatus, it is not necessary that the beer should be charged with gas at any time prior to its passage through the apparatus. As already stated, the beer is charged with gas under high pressure, while in the spray or vapor form, and is delivered to the faucet under relatively low pressure. Furthermore, this is accomplished without loss or waste of gas. It will therefore be understood that the automatic gas charging device constitutes one important feature of my invention, that the pressure reducing mechanism constitutes another important feature of the invention, and that their association, and their coöperating arrangement, constitute still another important feature of the invention. The safety valves in the tops of the two tanks prevent excessive pressure thereon, but will seldom be called into action.

From what has been said, it will be understood that the mechanism described is capable of modification within the scope of my invention as herein set forth and claimed.

What I claim is:—

1. In an apparatus of the character described, the combination with a high pressure charging tank and a reduction tank, of a gas supply connection opening into said charging tank, a conduit connecting the lower portion of said charging tank with said reduction tank, means for withdrawing liquid from said reduction tank, a pump with connections for delivering liquid into said charging tank, a power device for operating said pump, means for automatically starting and stopping said pump actuating power device, including a float located within said charging tank, a valve in the conduit between said two tanks, and means for automatically opening and closing said valve, including a float located within said reduction tank.

2. In an apparatus of the character described, the combination with a high pressure charging tank and a reducing tank, of a liquid supply connection opening into the upper portion of said charging tank, a gas supplying connection also opening into the upper portion of said charging tank, a tube connecting the lower portion of said charging tank with said reducing tank, means for withdrawing liquid from said reducing tank, a water-actuated pump interposed in said liquid supplying connection, for forcing liquid into said charging tank, a water delivery pipe leading to said pump for supplying motive power thereto, a controller valve in said water supplying pipe, a float within said charging tank, for actuating said pump controlling valve, a cut-off valve in the communicating tube between said two tanks, and a float in said reducing tank having connections for operating said cut-off valve, substantially as described.

3. In an apparatus of the character described, the combination with a high pressure charging tank and a reducing tank, of a liquid supply connection opening into the upper portion of said charging tank, a gas supplying connection also opening into the upper portion of said charging tank, a tube connecting the said charging tank with the reducing tank, means for withdrawing liquid from said reducing tank, a water-actuated pump interposed in said liquid supplying connection, for forcing liquid into said charging tank, a water delivery pipe leading to said pump for supplying motive power thereto, a controller valve in said water supplying pipe, a float within said charging tank, for actuating said pump controlling valve, a cut-off valve in the communicating tube between said two tanks, and a float in said reducing tank having connections for operating said cut-off valve, substantially as described.

4. In an apparatus of the character described, the combination with a high pressure charging tank and a reducing tank, of a liquid supply connection opening into said charging tank, a tube connecting said two tanks, means for withdrawing liquid from said reducing tank, a gas supply connection opening into said charging tank, a water-actuated pump interposed in said liquid supplying connection, for forcing the liquid into said charging tank, a water delivery pipe leading to said pump, for supplying the motive power thereto, a controller valve in said water supply pipe, a lever for operating said valve extending into said charging tank, a float applied to the inner end of said lever, a cut-off valve in the communicating tube between said two tanks, a lever for operating said cut-off valve extending into said reducing tank, and a float connected to the inner end of said lever, substantially as described.

In testimony whereof I affix my signature in presence of two witnesses.

EUGENE B. MOWER

Witnesses:
MALIE HOEL,
F. D. MERCHANT.